Patented Jan. 22, 1929.

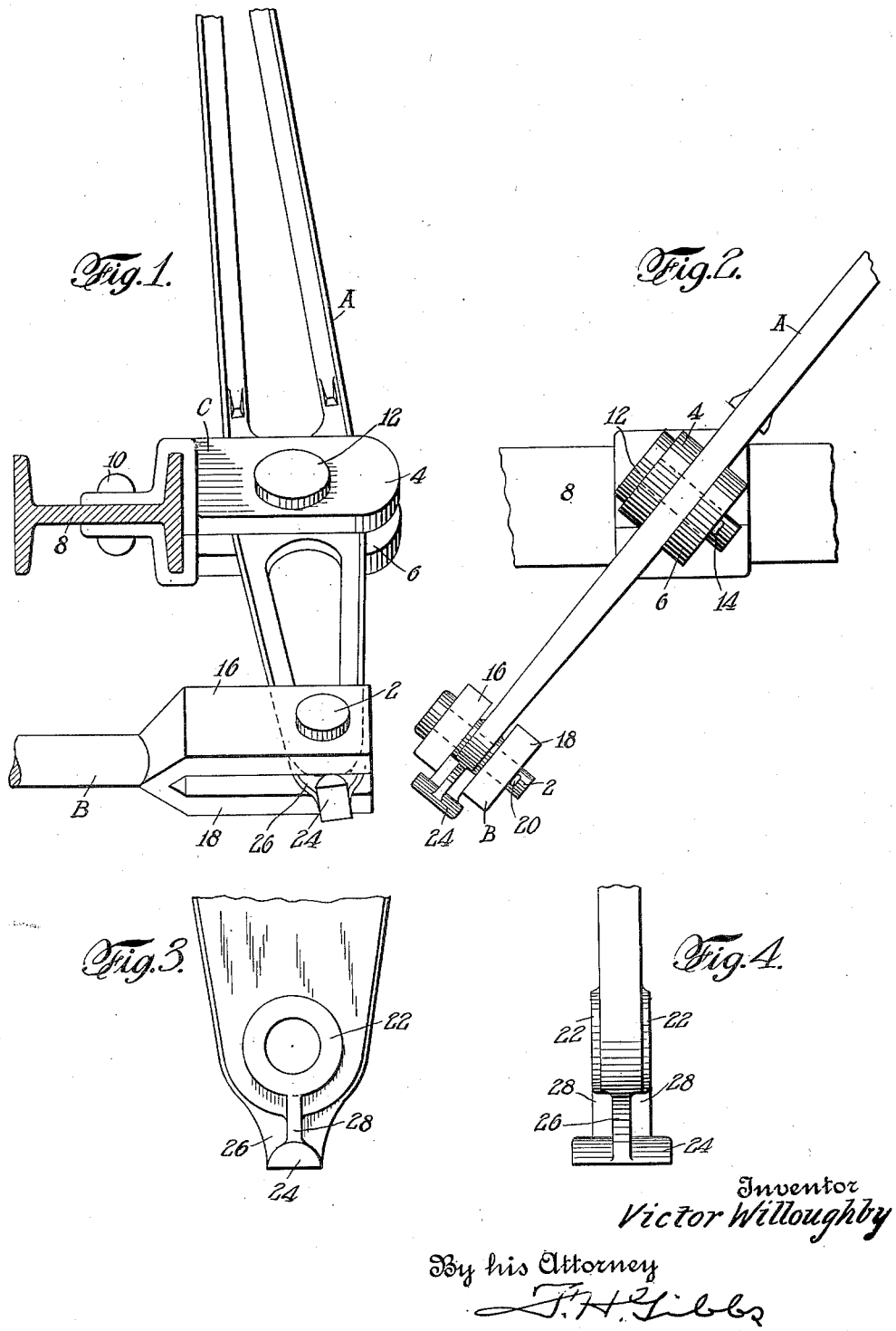

1,699,650

UNITED STATES PATENT OFFICE.

VICTOR WILLOUGHBY, OF RIDGEWOOD, NEW JERSEY, ASSIGNOR TO AMERICAN CAR AND FOUNDRY COMPANY, OF NEW YORK, N. Y., A CORPORATION OF NEW JERSEY.

BRAKE LEVER.

Application filed February 1, 1928. Serial No. 251,073.

Reference is had to the accompanying drawings which illustrate the preferred form of the invention, though it is to be understood that the invention is not limited to the exact details of construction shown and described, as it is obvious that various modifications thereof within the scope of the claims will occur to persons skilled in the art.

In the drawings:

Figure 1 is a side elevation of a fragment of a brake lever, brake beam and strut, showing the present invention;

Fig. 2 is a front elevation of the assembly shown in Fig. 1;

Fig. 3 is an enlarged detail side elevation of the lower end of the brake lever, and Fig. 4 is an enlarged detail front elevation of the lower end of the brake lever.

This invention relates to brake levers and has particular reference to levers so formed as to provide a connection between the bottom connecting rod of the brake and the brake lever, so as to prevent the dropping of the bottom connecting rod in the event of breaking of the connection between said lever and connecting rod.

One object of the present invention is to provide a simple, strong and durable construction of the character just described, which consists of few parts and which is easy and inexpensive to manufacture.

Another object of the invention is to provide an assembly of brake lever, brake beam and bottom connection which is so arranged that dropping of the bottom connection will be prevented in the event of loss of the usual pin which serves to connect the brake lever and bottom connection.

Other objects and advantages of this invention will be apparent from the following description taken with the accompanying drawings in which a brake lever is shown, being designated generally as A, and the connecting rod is indicated at B; the latter being connected by a pin 2 to the lower end of the brake lever A. The brake lever is arranged to extend between the spaced arms 4 and 6 of a brake beam strut C secured to the brake beam 8 by rivets 10 or the like, and is mounted therein by a suitable fulcrum pin 12 retained against displacement or loss by a cotter 14. The upper end of the lever A is adapted to be confined in a suitable guide (not shown) in the ordinary manner.

The end of the connecting rod B is formed into a yoke having spaced arms 16 and 18 between which the lower end of the brake lever is positioned; the pin 2 passing through the lever and arms and being secured against displacement by a cotter 20.

The lower end of the brake lever A is provided with bosses 22 on opposite sides thereof, such bosses being preferably annular in form and providing abutments or wearing surfaces which surround the pin receiving aperture in the lower end of the brake lever and which may bear against the opposed arms 16 and 18 for an obvious purpose.

The invention contemplates means for preventing dropping of the connecting rod B in the event of loss of pin 2. To effect this, the lower end of the brake lever A is provided with an integral supporting shoulder 24 arranged transverse to the horizontal plane of the lever, as clearly shown in Figs. 2 and 4. The shoulder is preferably formed with the lever as an extension thereof, being arranged below the spaced arms 16 and 18 and adapted to support the connecting rod B should pin 2 be broken or lost and the connection between the spaced arms 16 and 18 and the lower end of the brake lever thus broken.

In forming the shoulder 24, the lower end of the brake lever is provided with an integral extension 26 in the form of a web which merges with the shoulder 24 (see Fig. 4). For reinforcing the shoulder and the web 26, a reinforcing rib 28 extends from each of the bosses 22; the ribs 28 being oppositely disposed, as shown in Fig. 4, and being of substantially the same height as the bosses 22. The ribs 28, in addition to reinforcing the web 26 and the shoulder 24, also serve as bearing surfaces for the arms 16 and 18, as shown in Fig. 2, and thus eliminate any tendency of a loose connection between the connecting rod and the brake lever, and further eliminate any tendency of the brake lever and connecting rod to rattle.

From the above description, it is believed that the construction and operation of the device of the present invention will be fully apparent to those skilled in the art without further elaboration, and it is apparent that upon loss or breaking of pin 2, the connecting rod will not be lost but will drop onto the supporting shoulder 24 and be retained in such position until repairs can be made.

What is claimed is:

1. A brake lever having a web extending from the lower end thereof, a supporting shoulder formed integral with the web and arranged transverse to the horizontal plane of the lever, and oppositely disposed reinforcing ribs extending from the lever to the shoulder.

2. In a device of the kind described, the combination with a brake lever and a connecting rod pivotally secured to the lower end thereof, of a transversely arranged extension formed with the lower end of the lever and arranged below the connecting rod for supporting the latter upon failure of the pivotal connection.

3. In a device of the kind described, the combination with a brake lever and a connecting rod pivotally secured to the lower end thereof, of a shoulder secured to the lower end of the lever and arranged beneath the connecting rod for supporting the latter upon failure of the pivotal connection.

4. In a device of the kind described, the combination with a brake lever and a connecting rod pivotally connected to the lower end thereof, of an extension formed with the lower end of the lever and arranged beneath the connecting rod for supporting the latter upon failure of the pivotal connection.

In witness whereof I have hereunto set my hand.

VICTOR WILLOUGHBY